(12) United States Patent
Zehler

(10) Patent No.: US 9,826,109 B2
(45) Date of Patent: Nov. 21, 2017

(54) SYSTEM AND METHOD FOR DISTRIBUTION OF HARD COPY DOCUMENTS IN PULL PRINT SYSTEM

(71) Applicant: Xerox Corporation, Norwalk, CT (US)

(72) Inventor: Peter J. Zehler, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 2 days.

(21) Appl. No.: 14/873,315

(22) Filed: Oct. 2, 2015

(65) Prior Publication Data

US 2017/0099396 A1    Apr. 6, 2017

(51) Int. Cl.
*G06F 3/12* (2006.01)
*H04N 1/00* (2006.01)

(52) U.S. Cl.
CPC .......... *H04N 1/0023* (2013.01); *G06F 3/126* (2013.01); *G06F 3/1219* (2013.01); *G06F 3/1268* (2013.01); *G06F 3/1274* (2013.01); *G06F 3/1287* (2013.01); *H04N 2201/0094* (2013.01)

(58) Field of Classification Search
CPC ... H04N 1/0023; G06F 3/1268; G06F 3/1287; G06F 3/1274; G06F 3/126; G06F 3/1219
See application file for complete search history.

(56) References Cited

U.S. PATENT DOCUMENTS

| | | | |
|---|---|---|---|
| 8,040,541 B2 | 10/2011 | Smith | |
| 8,279,474 B2 | 10/2012 | Miyamoto | |
| 8,537,392 B2 | 9/2013 | d'Entrecasteaux | |
| 2003/0117638 A1* | 6/2003 | Ferlitsch | G06F 3/1204 358/1.13 |
| 2005/0024675 A1 | 2/2005 | Konno | |
| 2005/0177739 A1* | 8/2005 | Ferlitsch | G06F 21/608 713/189 |
| 2006/0053481 A1* | 3/2006 | Olsen | G06F 21/608 726/3 |
| 2006/0077462 A1 | 4/2006 | Saito | |
| 2007/0002365 A1 | 1/2007 | Pesar | |
| 2008/0209419 A1 | 8/2008 | Maeda | |
| 2010/0149572 A1 | 6/2010 | St. Jacques, Jr. | |
| 2011/0161794 A1* | 6/2011 | Shiohara | G06F 3/1205 715/209 |
| 2011/0261402 A1* | 10/2011 | Yamamoto | G06F 21/608 358/1.15 |
| 2012/0262753 A1* | 10/2012 | Viccari | H04N 1/00307 358/1.15 |
| 2013/0120765 A1* | 5/2013 | Wozniak | G06K 15/102 358/1.2 |

* cited by examiner

*Primary Examiner* — John Wallace
(74) *Attorney, Agent, or Firm* — Kevin Soules; Luis M. Ortiz; Kermit D. Lopez

(57) ABSTRACT

A method and system for distributing documents comprises submitting a print job via a print client to a server. The document creator can submit a list of recipients to whom a hard copy document should be made available. This limits the distribution of the document to those persons included on the list. The method and system further comprises storing the print job in a queue associated with the server, transmitting the print job to a specified printer when one of at least one recipient requests rendering of the print job, and rendering the print job at the specified printer for one of the at least one recipients.

15 Claims, 7 Drawing Sheets

SYSTEM AND METHOD FOR DISTRIBUTION OF HARD COPY DOCUMENTS IN PULL PRINT SYSTEM

TECHNICAL FIELD

Embodiments are generally related to the field of document rendering. Embodiments are also related to methods and systems for distributing documents. Embodiments are further related to methods and systems for rendering hard copy documents according to distribution lists using pull print systems.

BACKGROUND

Document rendering is an important aspect of nearly every facet of business. Currently, in order to deliver a hard copy document to another person, either the source document has to be transmitted to the person electronically or the hard copy document must be printed and physically handed off to the intended recipient.

However, for a variety of reasons there are circumstances where a user may not want to distribute original documents, electronically or otherwise. Furthermore, printing multiple copies of a document often results in waste since not all the intended recipients may be available or want the document. Therefore, a need exists for methods and systems that facilitate hard copy document distribution.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for distributing documents.

It is another aspect of the disclosed embodiments to provide a method and system for on demand printing using pull print systems.

It is yet another aspect of the disclosed embodiments to provide an enhanced method and system for electronically distributing documents via a pull print system that allows on demand rendering of the documents by a selected group of recipients.

The aforementioned aspects and other objectives and advantages can now be achieved as described herein. A method and system for distributing documents comprises submitting a print job via a print client to a server; storing the print job in a queue associated with the server; transmitting the print job to a specified printer when one of at least one recipient requests rendering of the print job; and rendering the print job at the specified printer for one of the at least one recipient.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The particular values and configurations discussed in the following non-limiting examples can be varied and are cited merely to illustrate one or more embodiments and are not intended to limit the scope thereof.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
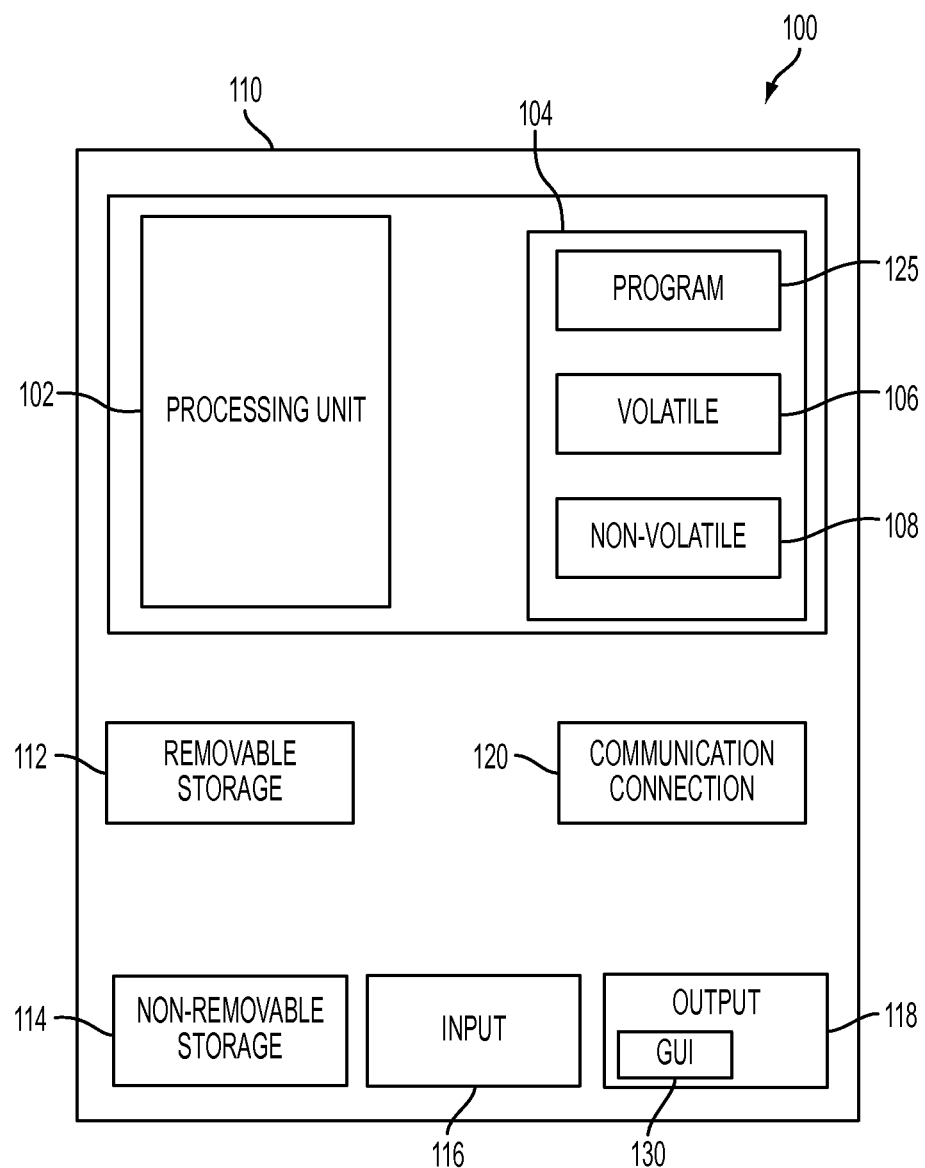
FIG. 1 depicts a block diagram of a computer system which is implemented in accordance with the disclosed embodiments.
Figure 2:
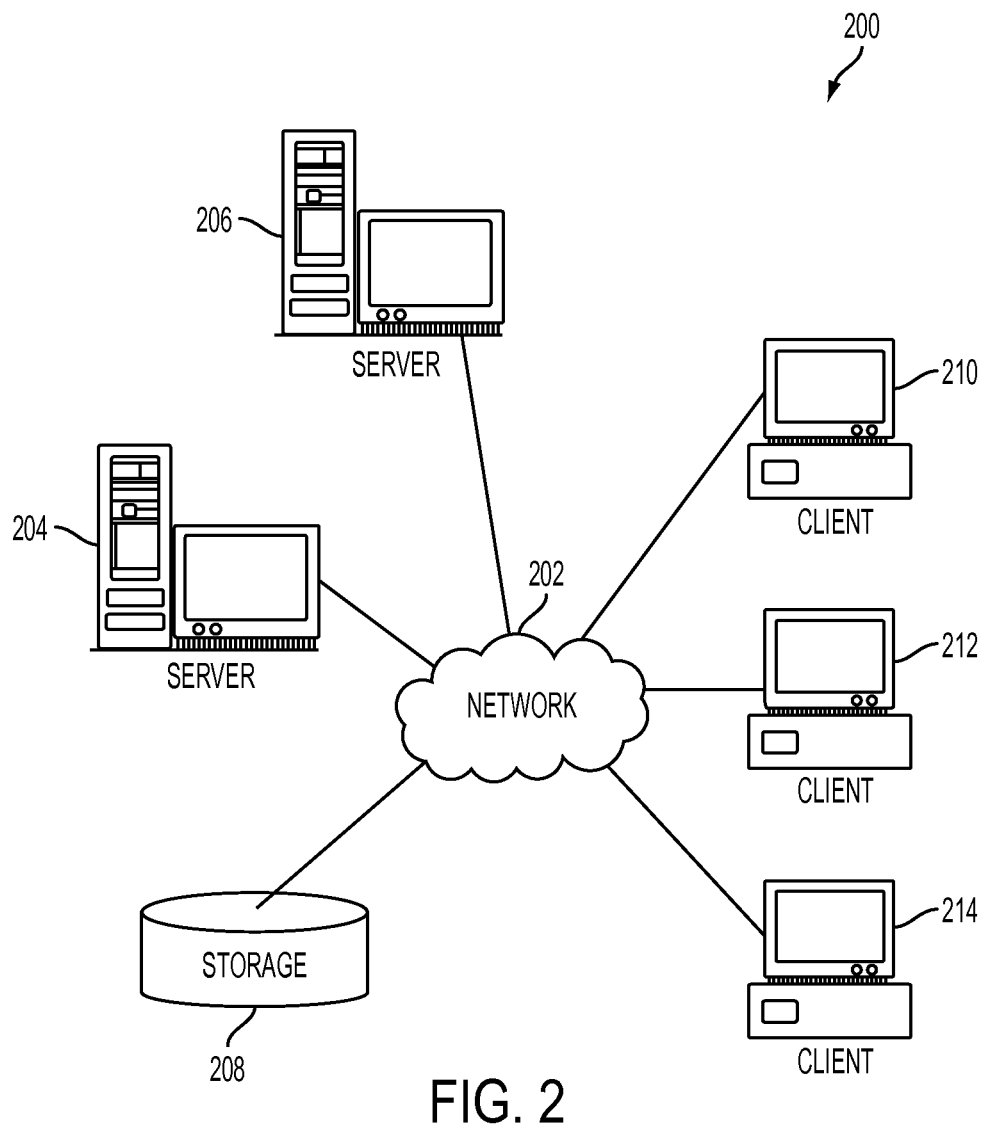
FIG. 2 depicts a graphical representation of a network of data-processing devices in which aspects of the present invention may be implemented.
Figure 3:
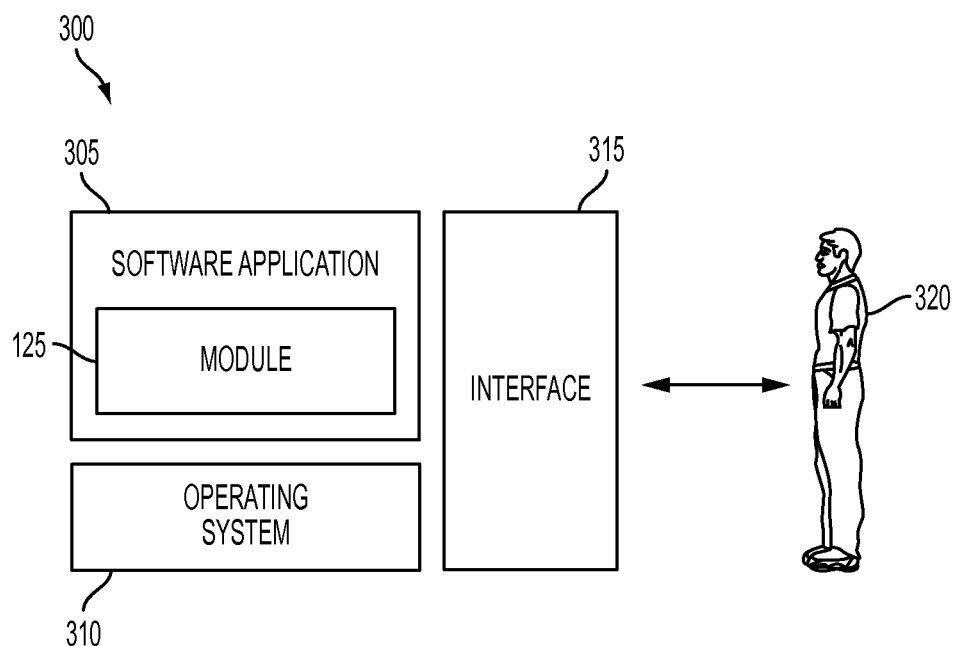
FIG. 3 depicts a computer software system for directing the operation of the data-processing system depicted in FIG. 1, in accordance with an embodiment of the invention.

FIGS. 1-3 are provided as exemplary diagrams of data-processing environments in which aspects of the embodiments may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing parts of the methods and systems disclosed herein is shown in FIG. 1. A computing device in the form of a computer 110 configured to interface with sensors, peripheral devices, and other elements disclosed herein may include one or more processing units 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

Computer 110 may include or have access to a computing environment that includes input 116, output 118, and a communication connection 120. The computer may operate in a networked environment using a communication connection 120 to connect to one or more remote computers, hand-held devices, printers, copiers, faxes, multi-function devices (MFDs), mobile devices, mobile phones, Smartphones, or other such devices. The remote computer may also include a personal computer (PC), server, router, network PC, a peer device or other common network node, or the like. The communication connection may include a Local Area Network (LAN), a Wide Area Network (WAN), Bluetooth connection, or other networks. This functionality is described more fully in the description associated with FIG. 2 below.

Output 118 is most commonly provided as a computer monitor, but may include any output device. Output 118 may also include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module or node 125, which can be representative of other modules or nodes described herein, are stored on a computer-readable medium and are executable by the processing unit 102 of computer 110. Program module or node 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 is a network of computers or other such devices such as printers, scanners, fax machines, MFDs, rendering devices, mobile phones, smartphones, tablet devices, and the like in which embodiments may be implemented. Note that the system 200 can be implemented in the context of a software module such as program module 125. The system 200 includes a network 202 in communication with one or more clients 210, 212, and 214. Network 202 may also be in communication with one or more servers 204 and 206, and storage 208. Network 202 is a medium that can be used to provide communication links between various devices and computers connected together within a networked data processing system such as computer system 100. Network 202 may include connections such as wired communication links, wireless communication links of various types, and fiber optic cables. Network 202 can communicate with one or more servers 204 and 206, one or more external devices such as rendering devices, printers, MFDs, mobile devices, and/or a memory storage unit such as, for example, memory or database 208.

In the depicted example, servers 204 and 206, and clients 210, 212, and 214 connect to network 202 along with storage unit 208. Clients 210, 212, and 214 may be, for example, personal computers or network computers, handheld devices, mobile devices, tablet devices, smartphones, personal digital assistants, printing devices, MFDs, etc. Computer system 100 depicted in FIG. 1 can be, for example, a client such as client 210 and/or 212.

Computer system 100 can also be implemented as a server such as server 206, depending upon design considerations. In the depicted example, server 206 provides data such as boot files, operating system images, applications, and application updates to clients 210, 212, and/or 214. Clients 210, 212, and 214 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a software system 300, which may be employed for directing the operation of the data-processing systems such as computer system 100 depicted in FIG. 1.

Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) or node(s) 125, may be "loaded" (i.e., transferred from removable storage 114 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, mobile phones, smartphones, tablet devices multi-processor systems, printers, copiers, fax machines, multi-function devices, data networks, microprocessor-based or programmable consumer electronics, networked personal computers, minicomputers, mainframe computers, servers, and the like.

Note that the term "module" or "node" as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term "module" may also simply refer to an application such as a computer program designed to assist in the performance of a specific task such as word processing, accounting, inventory management, etc., or a hardware component designed to equivalently assist in the performance of a task.

The interface 315 (e.g., a graphical user interface) can serve to display results, whereupon a user 320 may supply additional inputs or terminate a particular session. In some embodiments, operating system 310 and GUI 315 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to certain aspects of embodiments of the present invention, which can be embodied in the context of or require the use of a data-processing system such as computer system 100, in conjunction with program module 125, and data-processing system 200 and network 202 depicted in FIGS. 1-2. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, and the like. Therefore, the descriptions of the exemplary embodiments, which follow, are for purposes of illustration and not considered a limitation.

Pull print systems allow a user to submit a print job to a single queue. In pull print systems, the user can then pick up the job at a number of configured physical printers. There are a number of input channels that pull print systems can support including traditional driver-centric submission of a Page Description Language (PDL) from PCs and laptops and gateways to protocols such as the Internet Printing Protocol (IPP). In another embodiment, email can be used as a gateway for mobile printing. Email based gateways allow a user to submit attachments for printing.

The present embodiments make use of on demand printing associated with pull print systems. In one embodiment, a specified recipient's documents are sent to a rendering device only after the recipient, as opposed to the document creator, requests the output. During submission, the document creator can submit a list of recipients to whom a hard copy document should be made available. This limits the distribution of the document to those persons included on the list.

The lists may include, for example, a list of email addresses. Other forms of identification are possible such as user names or full recipient names. The list is submitted as an extension to the protocol (IPP), extension to the PDL's print ticket created and processed by a driver, or can be an additional attachment to an email submission. Once received by the pull print system, a job is created with the list of intended recipients.

The pull print system can then provide a notification email to all the recipients informing them of who is sending them a document, the document name, a list of printers where the document can be produced, and any other relevant information. When a recipient included in the distribution list logs into, or otherwise identifies themselves, at an appropriate printer, the distributed document will appear in a recipient's list of documents folder. Once the recipient has printed the document, the pull print system notes the delivery of the job to that recipient and optionally notifies the document creator of the distribution. The job can be retained until all the recipients have printed their copy of the document or until a configurable time limit passes.

A confirmation number or PIN associated with the distributed document for a destination printer can also be provided. It should be understood that in pull printing systems, a PIN can serve as a key that allows a document to be released. In the case where a confirmation number/PIN is provided, the recipient is prompted to enter the confirmation number/PIN at the printer. When the recipient enters the confirmation number/PIN, the distributed document is released.

The use of a confirmation number/PIN is not limited to printers with modern or comprehensive user interfaces. Many printers have limited user interface capabilities and may not be able to display a list of jobs. Other printers may not be equipped with software that is capable of "logging in" or verifying a user's identity. Nevertheless, the confirmation number/PIN may or may not be used in such circumstances depending on the capabilities of the printer. It should be appreciated that the confirmation number/PIN can be specific to a recipient. Thus, while the use of a confirmation number/PIN for document release is possible, it is also possible to associate the document with the recipient's user ID so that the document simply appears as one of recipient's documents available for printing.

Figure 4:
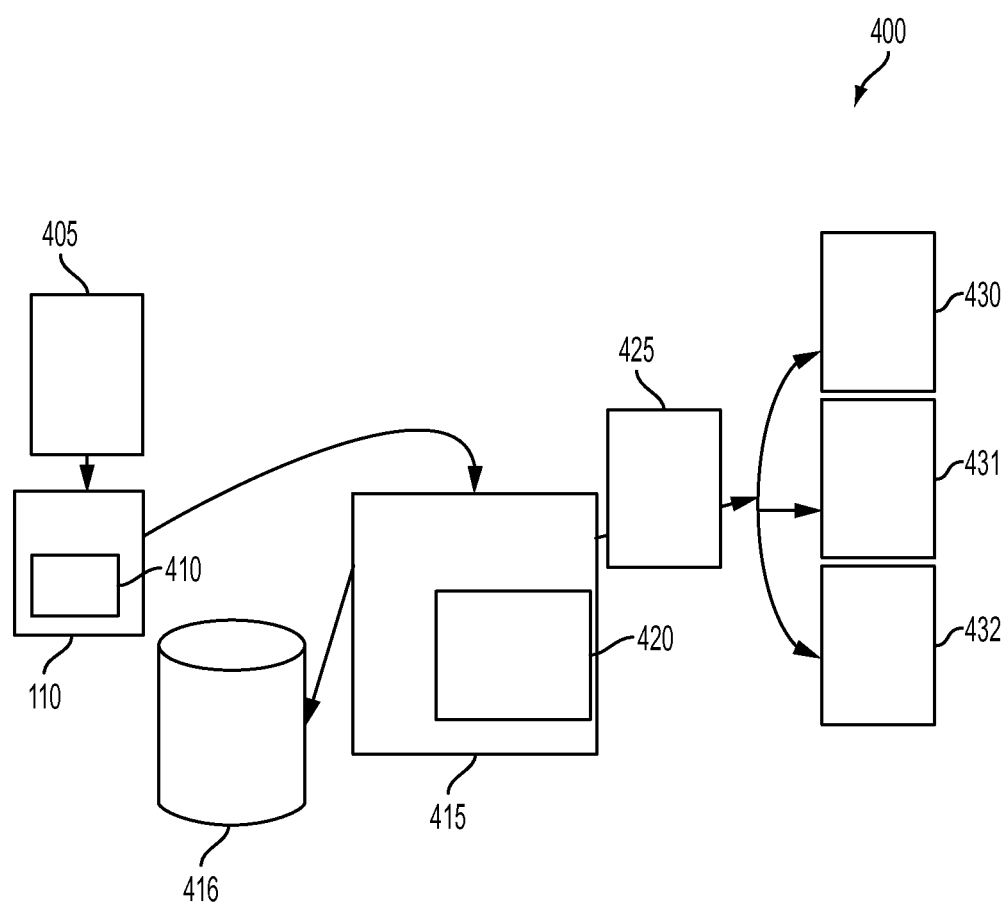
FIG. 4 depicts a block diagram of a system for rendering a document, in accordance with an embodiment of the present invention.

In a preferred embodiment illustrated in FIG. 4, the system consists of a number of components. A print client 410 can be installed on a computing device such as computer 110. Alternatively, the print client 410 can be a mobile client, desktop client (e.g., Windows print subsystem), or email client. The print client 410 may be a computer module that acts on behalf of the submitting user or creator of the document. The print client 410 may be embodied as transitory or non-transitory instruction media. Preferably, the print client 410 is configured to submit jobs using a pull print server 415, but other known servers may alternatively be used. The "walk and request" mode of printing disclosed herein is the basis of what is sometimes referred to as "pull printing" or related technologies such as those marketed under the trademark "FOLLOW ME."

In a typical situation, a source document 405 can be loaded into the print client 410 as shown in FIG. 4. The source document 405 is a document (e.g., a PDF file, a MS Word file, a JPEG Picture, a text file, etc.) that the document creator wishes to distribute to one or more other people.

The submitting user (most commonly the document creator) may submit a distribution list of recipients using the print client 410. The distribution list may include the recipients' email addresses or may identify users by username, actual name, or other such identifier. The distribution list may be included in a job ticket associated with the job. Preferably, the recipients can see the jobs when logging into a user interface for one of the printers. Alternatively, in less capable printers, entering a confirmation number/PIN will cause the job for the associated user to be printed.

The print server 415, which is preferably a pull print server 415, accepts print jobs from the print client 410. The print job can be queued in a data structure 416 associated with the printer server 415 until a recipient requests that the job be printed at a specific printer such as printer 430, 431, or 432. The pull print server 415 arranges for the source document 405 to be converted to an appropriate print ready document 425 for the selected printer.

The print ready document 425 is a printer specific document that the selected printer can print. It is important to note that printers 430, 431, and 432 may have different capabilities. The print server 415 can be made aware of the various capabilities of the printers 430, 431, and 432, and provide a print ready document 425 that is within the capabilities of the specified printer. The document can be converted using a document conversion subsystem 420.

The pull print server 415 retains the print job until all the recipients have printed a copy or until the job has timed out. The job can time out after a user or administrator specified period of time. The submitted print job will appear in the list of jobs for all the members of the distribution list.

The contents of the print job may be altered on a per user basis. For example, the rendered document may be a numbered document where the number embedded in the printout is associated with the receiving user. The information can be encoded in the document or can simply be added as a footer to each page. Other document modifications may also be achieved on a per user basis.

Figure 5:
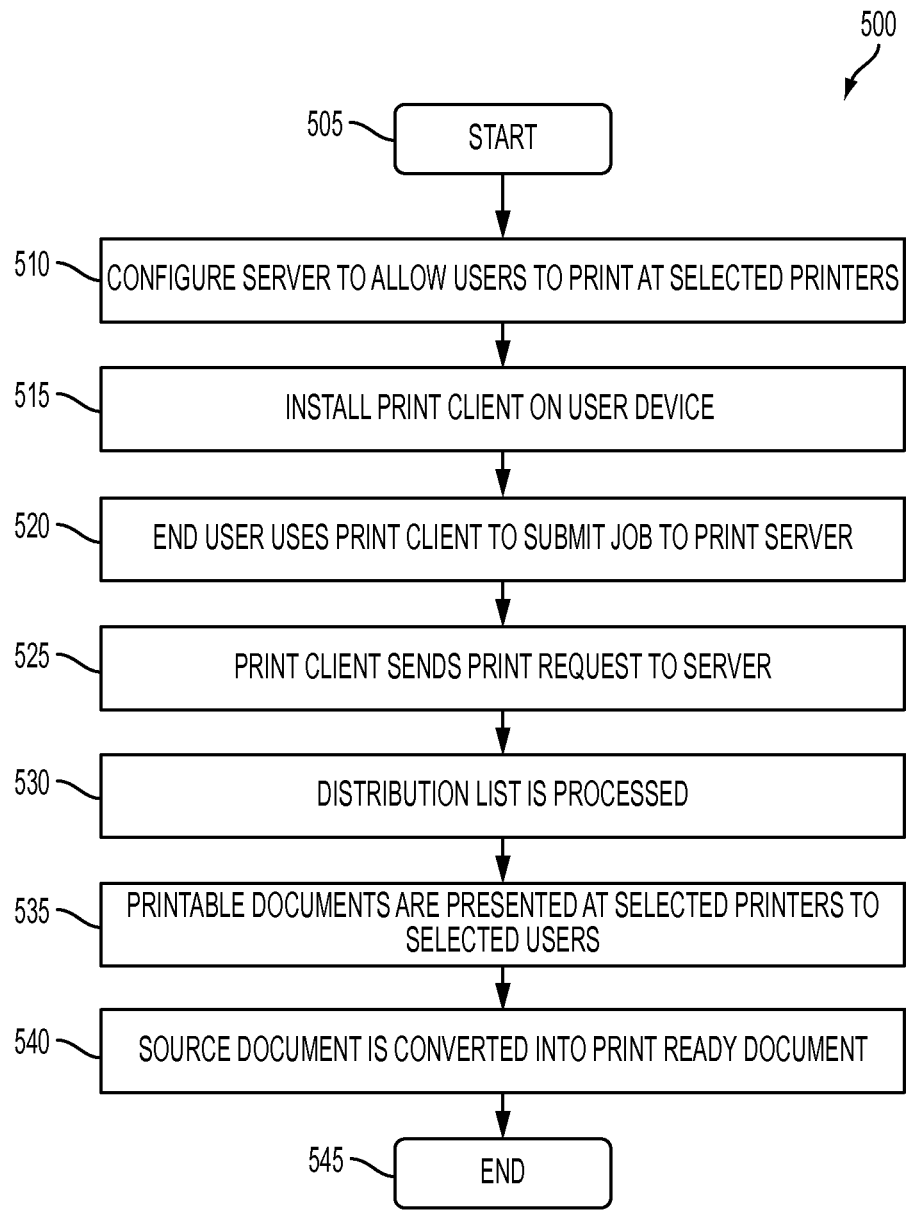
FIG. 5 depicts a flow chart of logical operational steps associated with a method for rendering a document, in accordance with an embodiment of the invention.

FIG. 5 illustrates logical operational steps associated with a method 500 for configuring a pull print system and rendering a document. The method begins at step 505. At step 510, the pull print server 415 is configured to allow a set of users to print at a number of printers. The pull print server 415 is a "walk and request" printing server which is the basis of what is sometimes referred to as "pull printing."

The capabilities of each printer can be stored in a document conversion subsystem database. In addition, the current configuration of each printer can be stored in the document conversion subsystem database. In one embodiment, the capabilities and configurations may be linked to the specific document formats that are supported. In addition, the distribution list feature associated with the pull printing server can be enabled.

Next at step 515, the pull printing compatible client can be installed on a user's device. The device may be any of a personal computer, mobile device, tablet device, or the like. The client may be a dedicated pull print client 410 that can submit a print job including the print job ticket, source document, and the distribution list.

It should be appreciated that the client may be a general-purpose client (e.g., Internet Printing Protocol (IPP), Air-Print, WS-Print) with extended print ticket attributes capable of holding the distribution list. In some instances, the client may be as simple as an email client where the source documents to be rendered are sent as attachments and the distribution list is transferred as an identifiable attachment.

Figure 6:
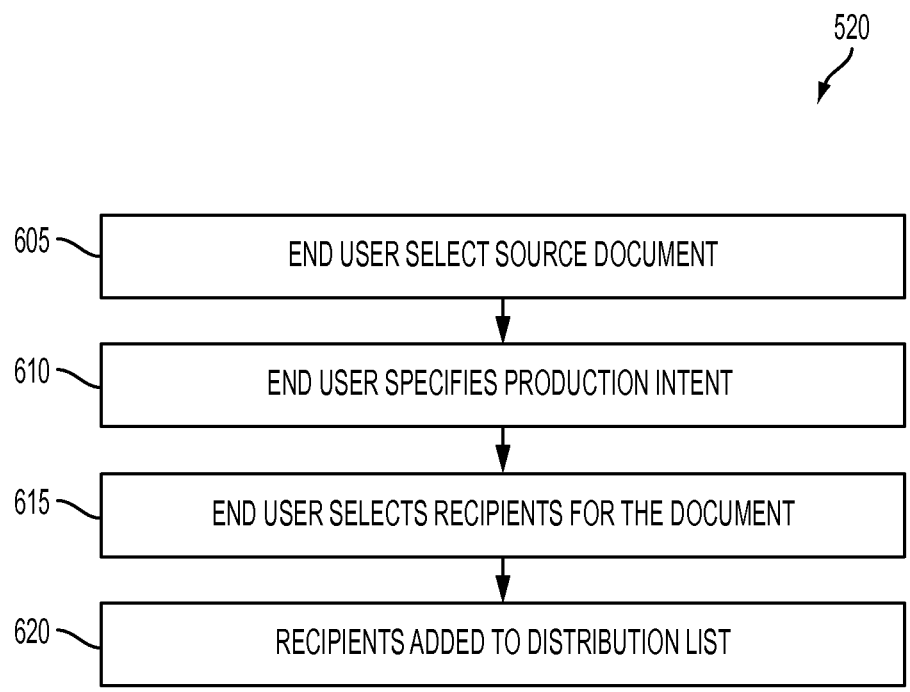
FIG. 6 depicts a flow chart of logical operational sub-steps associated with submitting a job to a server, in accordance an embodiment of the invention.

At step 520, the document creator or end user can use the print client 410 to submit a job to the pull print server 415. This can include a number of sub-steps as illustrated in FIG. 6. First, at step 605, the end user selects a source document 405 from a selection of documents or projects. The end user specifies the production intent associated with the selected documents or projects as shown at step 610. This can include the number of copies, media size, etc. The end user also selects the recipients for the document as shown at step 615. This may be via email address, name, username, or other such identification means. The end user then adds the recipients to the distribution list as shown at step 620. Step 520 is now complete.

The print client 410 sends the print job request to the pull print server 415, as shown at step 525. In an embodiment, the end user can specify a PIN that can be used at any of the printers to cause the print job output to be delivered to that printer. The document content is held pending instructions from the pull print server 415.

Figure 7:
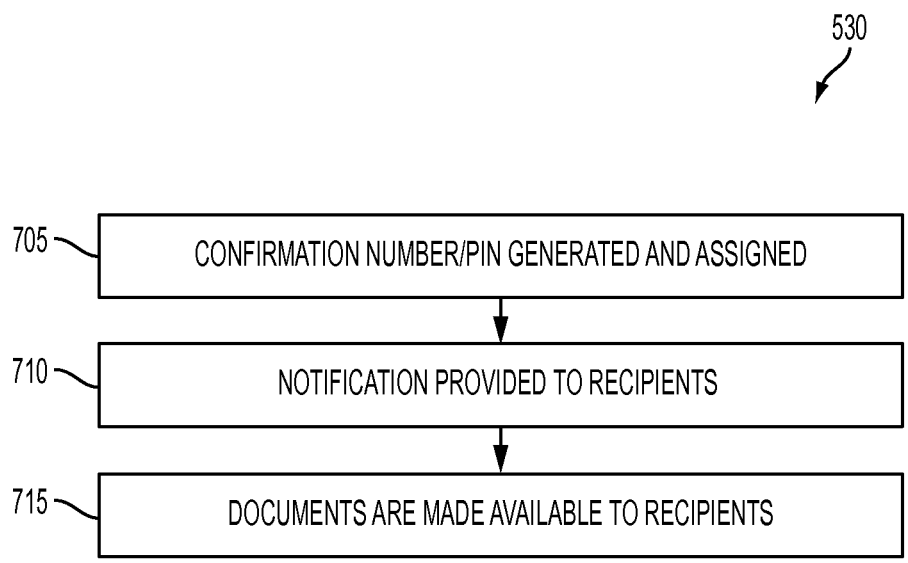
FIG. 7 depicts a flow chart of logical operational sub-steps associated with processing a distribution list, in accordance an embodiment of the invention.

After the pull print server 415 has processed the job request from step 525, the distribution list is processed at step 530. Processing the distribution list includes a number of sub-steps illustrated in FIG. 7. First, at step 705, a confirmation number or PIN may be generated and assigned to each recipient. It should be appreciated that the confirmation number/PIN may or may not be unique for each recipient. Preferably, the server is used to generate and assign the confirmation number/PIN. Next, as shown at step 710, an email notification, or other notification, is sent to each of the recipients listed in the distribution list. The notification can contain the name of the document(s), submitting user name, list of the printers where the document(s) may be picked up, and the confirmation number/PIN required to print the document(s). The documents are now available to the recipients at the printers identified by the end user as shown at step 715.

When the submitting user or a recipient on the distribution list logs into one of the selected printers, the list of documents presented will include the document(s) from the print job as shown at step 535. Each recipient is given the option to render, delete, or ignore the distributed document(s). Deleted and printed document(s) no longer appear in the recipient's list of documents at any printer.

If the recipient fails to render or otherwise address the document(s) presented to the recipient in a certain amount of time, the system will remove the document(s) from all the remaining user's list of available documents. A system administrator or the end user may set the amount of time before the document is removed.

If necessary, the conversion of the source document 405 to the print ready document(s) 425 may be done at the client or on the server as illustrated at step 540. It is only when the end user releases the job at a printer that the print ready document 425 is sent to the printer. It is also possible for the document conversion subsystem 420 to modify the print ready document to be a numbered document. The number can be, for example, watermarked, included in a header, embedded in microtext, or on a title page.

Based on the foregoing, it can be appreciated that a number of embodiments, preferred and alternative, are disclosed herein. For example, in one embodiment, a method for distributing documents comprises submitting a print job via a print client to a server, storing the print job in a queue associated with the server, transmitting the print job to a specified printer when one of at least one recipient requests rendering of the print job, and rendering the print job at the specified printer for the one of the at least one recipient.

In one embodiment, the server comprises a pull printing server. In another embodiment, the print job comprises a source document and a distribution list of the at least one recipient associated with the source document.

The method may further comprise notifying the at least one recipient on the distribution list of the print job. Rendering the job at the specified printer for one of the at least one recipients further comprises converting the source document to a print ready document. In another embodiment, rendering the print job at the specified printer for the one of the at least one recipients comprises numbering the print ready documents according to a total number of the at least one recipients, and limiting the rendering of the print ready documents to the numbered print ready documents associated with the at least one recipient.

In another embodiment, the method further comprises deleting the print job from the queue when all of the at least one recipient has requested rendering of the print job and deleting the print job from the queue at the ending of a specified time period.

The method further comprises authenticating the at least one recipient at one of the specified printers selected by the at least one recipient. The method can further comprise providing a pin number to the at least one recipient, wherein the pin number must be entered by the recipient at the specified printer before the print job will be rendered.

In another embodiment, a system for distributing documents comprises a print job provided to a server via a print client; a queue for storing the print job associated with the server; a specified printer wherein the print job is transmitted to the specified printer when one of at least one recipients requests rendering of the print job; and a rendering device that renders the print job at the specified printer for the one of the at least one recipient.

The server comprises a pull printing server. The print job comprises a source document and a distribution list of the at least one recipient associated with the source document. In one embodiment the source document is converted to a print ready document.

In another embodiment, the print ready document is numbered according to a total number of the at least one recipient, and the print ready documents comprise the numbered print ready documents associated with the at least one recipient.

In yet another embodiment, the print job is deleted from the queue when at least one of all of the at least one recipient has requested rendering of the print job, and a specified time period has elapsed.

The system can further comprise a pin number provided to the at least one recipient, wherein the pin number must be entered by the recipient at the specified printer before the print job will be rendered.

In another embodiment, a system for distributing documents comprises a rendering device, a server comprising a pull printing server, a processor, a data bus coupled to the processor, and a computer-usable medium embodying computer code, the computer-usable medium being coupled to the data bus, the computer program code comprising instructions executable by the processor and configured for submitting a print job comprising a source document and a distribution list of at least one recipient associated with the source document to the server via a print client; storing the print job in a queue associated with the server; transmitting the print job to a specified printer when one of at least one recipient requests rendering of the print job; and rendering the print job at the specified printer for the one of the at least one recipient.

In one embodiment, the instructions are further configured for notifying the at least one recipient on the distribution list of the print job and converting the source document to a print ready document. The instructions can also be configured for numbering the print ready documents according to a total number of the at least one recipient limiting the rendering of the print ready documents to the numbered print ready documents associated with the at least one recipient, and deleting the print job from the queue when all of the at least one recipient has requested rendering of the print job or at the ending of a specified time period.

It will be appreciated that variations of the above-disclosed and other features and functions, or alternatives thereof, may be desirably combined into many other different systems or applications. It will also be appreiciated that various presently unforeseen or unanticipated alternatives, modifications, variations or improvements therein may be subsequently made by those skilled in the art, which are also intended to be encompassed by the following claims.

What is claimed is:

1. A method for distributing documents comprising:
    submitting a print job via a print client to a server;
    storing said print job in a queue associated with said server;
    determining which of a plurality of printers is capable of processing said print job;
    designating at least one of said plurality of printers as one or more candidate printers where said print job can be rendered;
    transmitting said print job to one of said candidate printers when one of at least one recipient requests rendering of said print job at said candidate printer; and
    rendering said print job at said candidate printer for said one of said at least one recipient wherein rendering said print job further comprises converting said source document to a print ready document, establishing a limiting number of said print ready documents according to a total number of said at least one recipient, assigning a unique number to each of said print ready documents wherein said unique number is associated with one of said at least one recipient, embedding said unique number in each of said print ready documents, and limiting the rendering of said print ready documents to said limiting number of said print ready documents.

2. The method of claim 1 wherein said server comprises a pull printing server.

3. The method of claim 1 wherein said print job comprises a print job ticket, a source document and a distribution list of said at least one recipient associated with said source document.

4. The method of claim 3 further comprising:
notifying said at least one recipient on said distribution list of said print job wherein said notification comprises:
a name of said print job;
a name of a person submitting said print job;
a list of said candidate printers; and
a confirmation number.

5. The method of claim 1 further comprising:
deleting said print job from said queue when all of said at least one recipient has requested rendering of said print job.

6. The method of claim 1 further comprising:
deleting said print job from said queue at the ending of a specified time period.

7. The method of claim 1 further comprising:
authenticating said at least one recipient at one of said candidate printers selected by said at least one recipient.

8. The method of claim 1 further comprising:
providing a pin number to said at least one recipient, wherein said pin number must be entered by said recipient at said candidate printer before said print job will be rendered.

9. A system for distributing documents comprising:
a print job provided to a server via a print client;
a queue for storing said print job associated with said server;
a candidate printer comprising one or more printers among a plurality of printers determined to be capable of processing said print job wherein said print job is transmitted to one or more of said candidate printers when one of at least one recipient requests rendering of said print job at said candidate printer; and
a rendering device that converts said source document to a print ready document and renders said print job at said candidate printer for said one of said at least one recipient wherein a limiting number of said print ready documents is established according to a total number of said at least one recipient, a unique number is assigned to each of said print ready documents wherein said unique number is associated with one of said at least one recipient, said unique number is embedded in each of said print ready documents, and said print ready documents are limited in number to said limiting number of said print ready documents.

10. The system of claim 9 wherein said server comprises a pull printing server.

11. The system of claim 9 wherein said print job comprises a print job ticket, a source document and a distribution list of said at least one recipient associated with said source document.

12. The system of claim 9 wherein said print job is deleted from said queue when at least one of:
all of said at least one recipient has requested rendering of said print job; and
a specified time period has elapsed.

13. The system of claim 9 further comprising:
a pin number provided to said at least one recipient, wherein said pin number must be entered by said recipient at said candidate printer before said print job will be rendered.

14. A system for distributing documents comprising:
a rendering device;
a server comprising a pull printing server;
a processor;
a data bus coupled to said processor; and
a computer-usable medium embodying computer code, said computer-usable medium being coupled to said data bus, said computer program code comprising instructions executable by said processor and configured for:
submitting a print job comprising a source document and a distribution list of at least one recipient associated with said source document to said server via a print client;
storing said print job in a queue associated with said server;
determining which of a plurality of printers is capable of processing said print job;
designating at least one of said plurality of printers as one or more candidate printers where said print job can be rendered;
transmitting said print job to one of said candidate printers when one of at least one recipient requests rendering of said print job at said candidate printer;
converting said source document to a print ready document;
establishing a limiting number of said print ready documents according to a total number of said at least one recipient;
assigning a unique number to each of said print ready documents, wherein said unique number is associated with one of said at least one recipient;
embedding said unique number in each of said print ready documents;
limiting the rendering of said print ready documents to said limiting number of said print ready documents; and
rendering said print job at said candidate printer for said one of said at least one recipient.

15. The system of claim 14 wherein said instructions are further configured for:
notifying said at least one recipient on said distribution list of said print job wherein said notification comprises: a name of said print job, a name of a person submitting said print job, a list of said candidate printers, and a confirmation number.

* * * * *